(12) United States Patent
Parkinson

(10) Patent No.: US 8,012,359 B2
(45) Date of Patent: Sep. 6, 2011

(54) FILTRATION APPARATUS

(75) Inventor: David John Parkinson, North Somerset (GB)

(73) Assignee: KCC Group Limited (GB)

( * ) Notice: Subject to any disclaimer, the term of this patent is extended or adjusted under 35 U.S.C. 154(b) by 1094 days.

(21) Appl. No.: 10/553,080

(22) PCT Filed: Mar. 31, 2004

(86) PCT No.: PCT/GB2004/001351
§ 371 (c)(1),
(2), (4) Date: Feb. 23, 2007

(87) PCT Pub. No.: WO2004/089505
PCT Pub. Date: Oct. 21, 2004

(65) Prior Publication Data
US 2008/0257807 A1 Oct. 23, 2008

(30) Foreign Application Priority Data
Apr. 10, 2003 (GB) .................................. 0308291.4

(51) Int. Cl.
*B01D 37/00* (2006.01)
*B01D 24/46* (2006.01)
(52) U.S. Cl. ........ 210/786; 210/269; 210/275; 210/279; 210/795; 210/748.02; 210/186; 210/618; 210/670
(58) Field of Classification Search .................... None
See application file for complete search history.

(56) References Cited

U.S. PATENT DOCUMENTS

| 165,377 | A | | 7/1875 | Sinclaire |
| 961,180 | A | * | 6/1910 | Utley ............................. 210/274 |
| 1,784,893 | A | | 12/1930 | Duden |
| 2,973,097 | A | * | 2/1961 | Snider ............................ 210/279 |
| 3,532,216 | A | * | 10/1970 | Cederholm et al. ............ 210/95 |
| 3,550,774 | A | * | 12/1970 | Hirs et al. ...................... 210/792 |
| 3,552,569 | A | * | 1/1971 | Zievers et al. ................. 210/189 |
| 3,557,955 | A | * | 1/1971 | Hirs et al. ...................... 210/793 |
| 3,557,961 | A | * | 1/1971 | Stuart, Sr. ..................... 210/272 |
| 3,617,558 | A | * | 11/1971 | Jones ............................ 210/677 |
| 3,625,365 | A | * | 12/1971 | Armstrong et al. ........... 210/232 |
| 3,747,768 | A | * | 7/1973 | Barrera .......................... 210/288 |
| 3,757,954 | A | * | 9/1973 | Toth ............................... 210/277 |
| 4,197,201 | A | | 4/1980 | Hjelmner et al. |
| 4,240,911 | A | | 12/1980 | Demeter et al. |
| 4,246,102 | A | * | 1/1981 | Hjelmner et al. ............. 210/704 |

(Continued)

FOREIGN PATENT DOCUMENTS

DE 1 611 096 9/1970

(Continued)

*Primary Examiner* — Robert James Popovics
(74) *Attorney, Agent, or Firm* — Mossman Kumar & Tyler PC

(57) ABSTRACT

A radial or crossflow media filter comprising a housing such as a vessel or tank (1), the housing containing filter media (9), a contaminated flow inlet (2) and a discharge outlet (8), the inlet comprising a manifold (5) situated within the housing, the manifold (5) having flow outlets (6) which are directed laterally, away from the discharge outlet (8). The flow inlet may comprise a substantially vertically aligned elongate tubular manifold (5) with a plurality of flow distribution holes or slots disposed along its length. Furthermore, the discharge outlet (8) may be accessed through a chamber within the housing which contains a second filter media (11) which is of larger average particle size than the first filter media (9).

18 Claims, 6 Drawing Sheets

U.S. PATENT DOCUMENTS

| | | | |
|---|---|---|---|
| 4,441,998 A | 4/1984 | Ueda | |
| 4,496,464 A * | 1/1985 | Hensley | 210/792 |
| 4,707,252 A * | 11/1987 | Durot et al. | 210/151 |
| 4,719,010 A | 1/1988 | Seibel | |
| 4,787,987 A * | 11/1988 | Hensley | 210/792 |
| 4,826,609 A * | 5/1989 | Hensley | 210/792 |
| 4,861,472 A * | 8/1989 | Weis | 210/189 |
| 4,900,434 A * | 2/1990 | Schade | 210/189 |
| 4,966,698 A * | 10/1990 | Hensley | 210/269 |
| 4,976,934 A | 12/1990 | Maringer et al. | |
| 5,171,443 A * | 12/1992 | Bratten | 210/280 |
| 5,407,574 A * | 4/1995 | Hensley | 210/269 |
| 5,474,585 A * | 12/1995 | Geibel et al. | 55/302 |
| 5,635,080 A * | 6/1997 | Hensley | 210/792 |
| 5,637,278 A * | 6/1997 | Smith et al. | 422/144 |
| 5,681,472 A * | 10/1997 | Jonsson et al. | 210/618 |
| 5,833,867 A * | 11/1998 | Hensley | 210/792 |
| 6,033,566 A * | 3/2000 | Averill et al. | 210/341 |
| 6,143,186 A * | 11/2000 | Van Unen | 210/786 |
| 6,319,396 B1 | 11/2001 | Heagey | 210/151 |
| 6,326,191 B2 | 12/2001 | VanToever | 435/299.1 |
| 6,365,044 B1 * | 4/2002 | Crane | 210/248 |
| 6,617,155 B1 | 9/2003 | Van Toever | 435/297.1 |
| 6,641,737 B2 * | 11/2003 | Xia et al. | 210/676 |
| 6,685,826 B1 * | 2/2004 | James | 210/150 |
| 6,709,574 B2 * | 3/2004 | James | 210/90 |
| 6,790,351 B2 * | 9/2004 | Xia et al. | 210/189 |
| 6,966,987 B1 * | 11/2005 | Morgan et al. | 210/279 |
| 6,977,064 B1 | 12/2005 | Adris et al. | 422/145 |
| 7,001,521 B2 * | 2/2006 | Paananen et al. | 210/656 |
| 7,022,230 B2 * | 4/2006 | Imai et al. | 210/289 |
| 7,303,682 B2 * | 12/2007 | Paananen et al. | 210/656 |
| 7,341,662 B2 * | 3/2008 | Tolley et al. | 210/275 |
| 7,381,336 B2 * | 6/2008 | Stedman | 210/741 |
| 7,399,416 B2 * | 7/2008 | Moller et al. | 210/673 |
| 7,445,721 B2 * | 11/2008 | Moller | 210/760 |
| 7,553,418 B2 * | 6/2009 | Khudenko et al. | 210/601 |
| 7,713,423 B2 * | 5/2010 | Moller et al. | 210/667 |
| 7,713,426 B2 * | 5/2010 | Newcombe | 210/748.01 |
| 7,744,764 B2 * | 6/2010 | Moller et al. | 210/661 |
| 7,897,040 B2 * | 3/2011 | Newcombe et al. | 210/108 |
| 2002/0036164 A1* | 3/2002 | Xia et al. | 210/263 |
| 2003/0066792 A1* | 4/2003 | Xia et al. | 210/189 |
| 2004/0050762 A1* | 3/2004 | Xia et al. | 210/189 |
| 2004/0195162 A1* | 10/2004 | Imai et al. | 210/289 |
| 2005/0035071 A1* | 2/2005 | Tolley et al. | 210/793 |
| 2008/0099413 A1* | 5/2008 | Tolley et al. | 210/793 |
| 2008/0257807 A1* | 10/2008 | Parkinson | 210/175 |
| 2008/0277349 A1* | 11/2008 | Moller et al. | 210/673 |
| 2008/0302726 A1* | 12/2008 | Moller et al. | 210/661 |
| 2009/0071909 A1* | 3/2009 | Newcombe et al. | 210/739 |
| 2009/0178980 A1* | 7/2009 | Newcombe | 210/748 |
| 2010/0133196 A1* | 6/2010 | Khudenko | 210/668 |

FOREIGN PATENT DOCUMENTS

| | | |
|---|---|---|
| DE | 100 47 530 A1 | 4/2002 |
| EP | 0 502 262 A1 | 9/1992 |
| EP | 0 590 705 A1 | 4/1994 |
| EP | 0 857 507 A1 | 12/1997 |
| GB | 2432130 A * | 5/2007 |
| JP | 2002 361005 | 12/2002 |
| JP | 2002 361009 | 12/2002 |
| RU | 2 000 135 | 9/1993 |
| WO | 0021635 | 4/2000 |

* cited by examiner

FILTRATION APPARATUS

BACKGROUND TO THE INVENTION

There is a considerable need worldwide to generate more pure water for potable and industrial uses, which itself creates both domestic and industrial waste streams requiring further treatment prior to recycling or discharge to the environment. The use of cartridge filter elements that require frequent cleaning or changing, although an efficient means of filtration, creates a waste stream of used cartridge elements which is a further waste disposal problem.

It is also known to carry out downflow and upflow filtration of suspended solids from a liquid stream using a granular media bed, either atmospherically in concrete, plastic, metal or GRP tanks or above atmospheric pressure inside a suitably designed pressure vessel manufactured in metal, plastic or GRP. Many variants are known in distribution and collection methodology, in the media selection, and in chemical enhancement and filtration velocities.

The space and weight requirements of current filtration devices is also becoming a limiting factor in expanding or new build water treatment facilities, particularly for use on offshore oil exploration and production platforms. There is a need therefore for a compact media filter that minimises discharge to the environment, uses the minimum media wash water, and has the ability to operate successfully under the type of motions experienced on floating production facilities.

It is also known to use a radial media filter that has the ability to wash its media whilst online. This provides advantages, both in terms of the throughput versus space and weight, and allows the filter to operate whilst under the influence of gravitational forces due to motion.

Although the better designs go a good way to answering some of the problems associated with radial filtration and the backwash of its media, they do have some features which limit their effectiveness, such as a peripheral inlet screen that defines an annulus to receive water to be filtered, and distribute it radially into the media bed. In practice this screen is expected to retain media and inhibit it from entering the inlet distribution annulus. Should a very fine media be utilised then this screen's open area will be required to have a very small gap size to retain the fine media, and as such will act as an edge filter for large particles at the filter's inlet, so that filtration takes place on the outside of the inlet screen in the inlet annulus area.

This is undesirable as it will require a method of cleaning this screen or at least a strainer upstream of the filter to ensure that no particles larger than the screen gap size are delivered to the filter. Also, the central collection screen of this unit has no media support material, which means that the inner collection screen must also have a very fine screen gap size, one example of which would be a wedge wire screen.

The fluxrate (volumetric flowrate of raw water per unit area) for a given flowrate in a radial filter increases as the flow approaches the centre of the filter. The Reynolds number increases dramatically compared to its number at the outer diameter of the media bed. This can create large pressure drops and force fine suspended solids to migrate through the bed, particularly whilst the bed is in wash mode whilst on line.

STATEMENTS OF INVENTION

According to a first aspect of the present invention there is provided a radial or crossflow filter comprising a housing containing filter media, a contaminated flow inlet and a discharge outlet, the contaminated flow inlet comprising a manifold situated within the housing, the manifold having a flow outlet which directs flow laterally, away from the discharge outlet.

Preferably, the flow outlet is directed towards a sidewall of the housing. Preferably, the manifold is provided with a plurality of flow outlets.

Preferably, the housing is a vessel, such as a pressure vessel or tank. Preferably, the flow inlet comprises a substantially vertically aligned elongate manifold with a plurality of flow distribution outlets disposed along its length.

Preferably, a discharge chamber is provided within the housing which is upstream of the discharge outlet and which contains a second filter media which is of a larger average particle size than the rest of the filter media in the housing. Preferably, the discharge chamber surrounds the discharge outlet. Preferably, the discharge chamber is formed from a filter screen. Most preferably the filter screen tapers inwardly towards a bottom of the housing.

According to a preferred embodiment, there is provided a radial or crossflow media filter that has a combined inlet and distribution system for raw water to be treated. The distribution system can be made up of a series of cylindrical and torroidal shaped piping which has an array of distribution nozzles, slots or holes designed with an open area distribution such that they direct the flow outwardly and distribute it equally away from the discharge outlet. Most preferably, the flow is directed towards a sidewall of the housing so that it rebounds off the inside of the housing, thereby directing the resultant flow inwardly towards the centre in the case of a radial filter, or across from the inlet side to the outlet side in the case of a crossflow filter.

The discharge outlet may be provided with a filter screen which defines the chamber containing the second filter media. The chamber may retain a media support bed made up of a larger particulate material than the particulate material used for filtering, in order to inhibit loss of such fine media to the clean water side or blockage of the clean water collection screens, which may comprise small slots or holes.

Preferably, a fluidising unit is provided to remove and wash media and replace it back into the housing, whilst the filter unit is on line.

Preferably, a second fluidising unit is provided to enable the washing of the media support bed and replacement of the bed without the need to enter the housing.

Preferably, filter media to be cleaned in a cyclonic or counterflow wash vessel passes through one of the following:—
a) A tubular ultrasonic unit; and/or
b) A heating unit (for example an induction coil or a microwave heating device).

Preferably, means is provided for using AC or DC current, or magnetic force to re-enforce or neutralise a given Zeta potential on either contaminates, media, or fluid being filtered.

According to a second aspect of the present invention there is provided a filter comprising a housing containing filter media, a contaminated flow inlet and a discharge outlet, the contaminated flow inlet comprising a substantially vertically aligned elongate manifold with a plurality of flow distribution outlets disposed along its length.

According to a third aspect of the present invention there is provided a filter comprising a housing containing a first filter media, a contaminated flow inlet, a discharge outlet, and a discharge chamber within the housing which is upstream of the discharge outlet and which contains a second filter media which is of larger average particle size than the first filter media. Preferably, the discharge chamber is formed from a filter screen. Preferably, the filter screen tapers inwardly towards a bottom of the housing.

An advantage of present invention is that, because the contaminated inlet flow is spread evenly through the filter bed, the contaminated inlet flow to be filtered only has to be pre-screened to remove the largest suspended particles. This might be particles of approximately one seventh of the inside diameter of the fluidising unit's slurry outlet pipe. For example, in the case where the inside diameter of the fluidising unit's slurry outlet pipe was 20 mm, the largest permissible particle to enter the filter vessel should be equal to or less than 3 mm. The fluidising unit internal diameter could be chosen to manage a given particle size in the contaminated flow inlet.

A further advantage is that the contaminated flow inlet to the filter vessel or tank receives and distributes flow evenly over the complete surface area available for filtration of the granular media bed in any of the following modes; radial, downflow, crossflow and upflow, whilst being capable of receiving high concentrations of solids. Also, within the aforementioned limits of particle sizes, some of the granular media filter bed's media particles that may under certain conditions find their way into the raw water distribution system are prevented from flowing back into the raw water inlet.

A further advantage is that a filter in accordance with the present invention does not require an infill of support media of pea gravel or concrete at its base in order to avoid stagnant zones which have the potential to sustain biological activity.

Preferably, very fine ceramic spheres with selected or forced Zeta potential are used as the filter media. This will enable the unit to achieve extremely high removal efficiencies of very fine particles. This has normally been a barrier in fine media filtration as it would require a coarse strainer for the removal of particles of approximately 80 microns and above (particularly for use in cleaning backwash water), upstream of a fine filter. The reason for this coarse straining would be to remove the large particles in an attempt to make use of the voidage of the filter media bed and to ensure that the solids holding capacity of the bed was not reduced by contamination with larger particles. For a downflow dual media filter, two media types, i.e. large particles above small particles, could be employed, thus creating a large solids holding capacity in the upper large media (typically anthracite), and a smaller voidage on the lower smaller fine filter media (typically sand or garnet) in an attempt to create true depth filtration, i.e. penetration of contaminate particles throughout the filter bed as opposed to edge filtration on the top of the media.

A conventional dual media filter is a very efficient system for fine filtration, but requires complex backwash sequences which encompass the use of large volumes of air typically via a roots blower, together with large volumes of wash water, typically pre-screened to 80 microns (in the case of potable water filtration it would be necessary to use fully treated potable water), and arranged such that it can be controlled for both low and high flowrates. Backwashing such a filter has always been limited to the upwards velocity which would cause the media itself to leave the vessel, which necessitates a slow wash for a long time.

Hence a great deal of waste water is generated, having a low concentration of contaminates in it. By utilising a single media with a high density but small size, acceptable filtration can be achieved, but for shorter run times as the smaller the media grains become the more the filter acts as an edge filter, as opposed to a full volume filter. This, together with a lower voidage volume available for contaminant holding in the small media, causes a faster growth in pressure drop across the bed, hence requiring more frequent washing.

In the present invention, one method of filtration is the use of radial flow, together with downflow, to achieve the required filtration using small high density spherical media. Particular attention should be paid to the Zeta potential of the media and the smaller contaminant particles to maximise the use of the dense layer of charged ions (the Stem Layer) around the said particles in the liquid. Whereas this potential has been known for some time, its use has been limited, partially due to the lack of solids holding capacity when using very small media.

In the present invention it is possible to wash the entire media bed in a very short time utilising minimal potable water or in some cases raw inlet water. Due to this ability, together with the potential for online washing (washing of the media whilst the filter is still filtering water) it is now practical to design an efficient filter that can manage high concentrations of suspended solids, which can include quite large particles, yet achieve very high water qualities. Such a filter can replace a coarse strainer, fine media filter, and in some cases a polishing cartridge filter, with a single unit that will have a lower plot area, lower weight and potentially a lower capital cost, than the aforementioned three units.

As a suitable media support arrangement that can be cleaned is supplied in accordance with the present invention, the diameter of the central collection screen can be increased, which lowers the fluxrates and Reynolds number as it approaches the centre of the media bed.

In accordance with another feature of the present invention, the distribution of water to be filtered is controlled accurately, such that all areas of the filter bed receive as near as possible the same flow (flow sharing), thus avoiding channelling or flow taking the least line of resistance to the central collection screen. A further mechanical advantage is that the present invention excludes joints which are potential leak paths from the dirty water side to the clean water side, inside the housing (particularly where the housing is pressurised), ensuring therefore that no dirty water can leak to the clean water. Any such joints are preferably positioned on the outside of the vessel for maintenance reasons.

BRIEF DESCRIPTION OF DRAWINGS

For a better understanding of the present invention, and to show more clearly how it may be carried into effect, reference will now be made, by way of example, to the accompanying drawings, in which:—

DETAILED DESCRIPTION OF PREFERRED EMBODIMENTS

Figure 1:
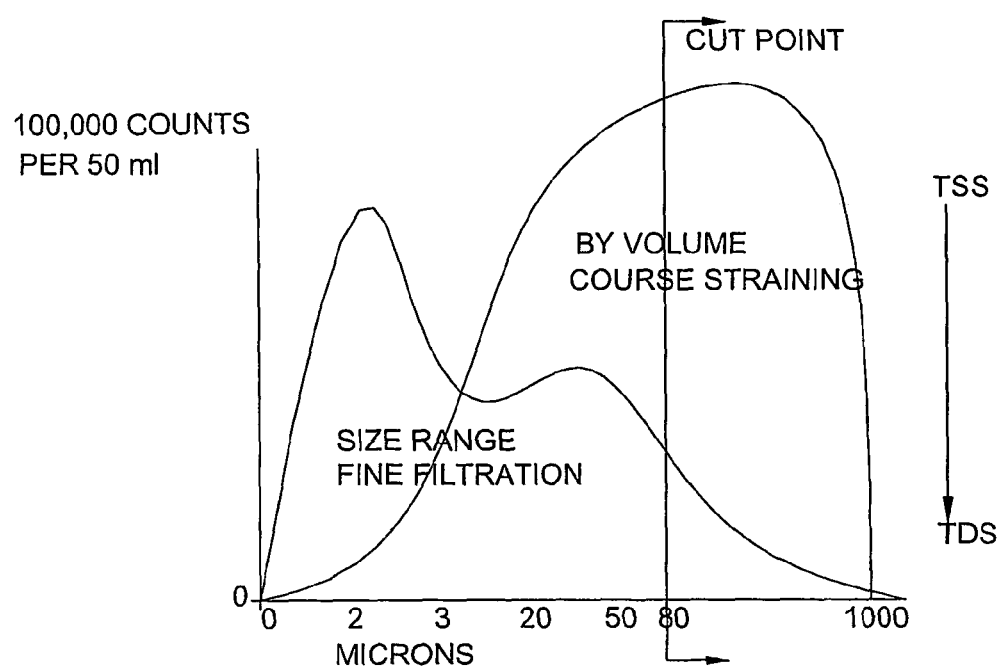
FIG. 1 is a plot of a typical suspended solids concentration as may be seen during a plankton bloom in seawater.

From the plot of FIG. 1 it can be seen that a lower number of larger particles account for the bulk of the volume of contaminants. In a conventional filtration process, it would be normal to attempt to remove the vast majority of these large particles at some cut off point, in this example around 80 microns and above with a coarse filter, so that any fine filtration would only need to remove smaller particles. The present invention seeks to achieve this degree of filtration with one filtration step.

Figure 2:
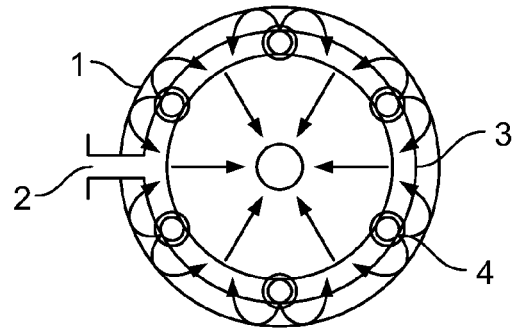
FIG. 2 is a cross-sectional view of a radial media filter and shows the inward radial flow created by the distribution system towards a central clean water collection screen.
Figures 3, 8:
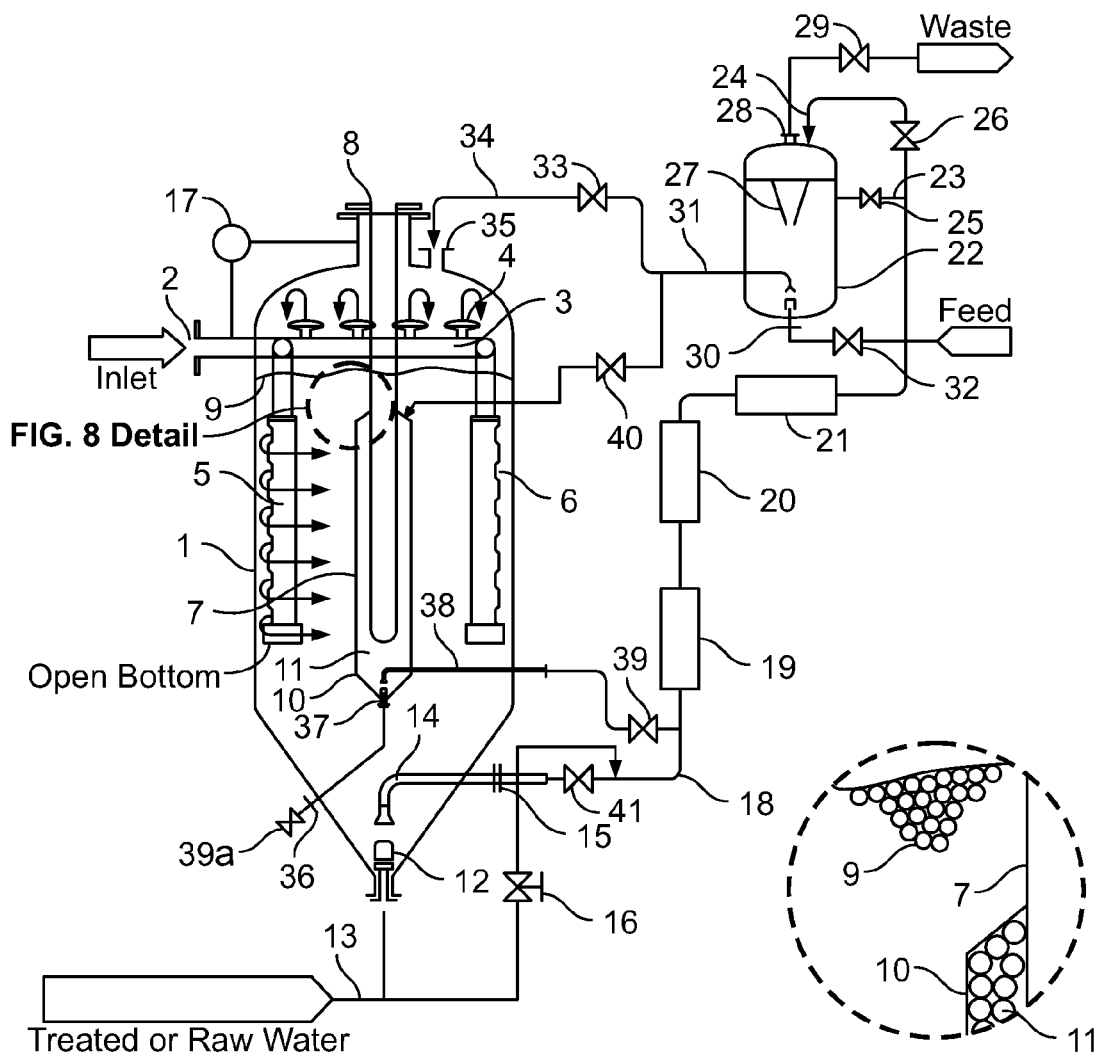
FIG. 3 is a sectional view of a pressurised radial media filter.
FIG. 8 is a detailed view of the circle in FIG. 3 of the sectional view of the pressurized radial media filter.

Referring to FIGS. 2 and 3, a pressure vessel or tank 1 has an inlet means 2 for raw water to be treated which connects with a distribution ring 3. The distribution ring 3 has a plurality of flow distribution heads 4, to distribute a portion of the inlet flow upwards to the top of the vessel 1, and a plurality of substantially vertical flow distribution tubes 5 which have distribution holes or slots 6 designed such that the flow of raw water is equally distributed and directed radially outwards against a wall of vessel 1, from where it reverses flow and travels radially inwardly towards a central collection screen 7. After travelling through a filter media 9 the filtered water passes out of vessel 1 through a clean water discharge outlet 8.

A secondary central screen 10 is arranged outside and sealed to the central collection screen 7, to create an annulus and bottom chamber around screen 7, such that this annulus and bottom space can be filled with large media support material 11. At the base of the secondary screen 10 is fitted a secondary fluidising unit 37 that has an outlet 38 which connects with a media wash line 18. A valve means 39 is provided for the isolation of the support media outlet 38 when not in use, and a further valve means 39a is provided for the isolation of the secondary fluidising unit 37 when it is not in use.

The secondary fluidising unit 37 and its slurry outlet 38 are used as a means to remove the support media and wash it. Valve means 40 is opened with valve means 33 closed in order to return the clean support media from media wash vessel 22 back to the media support screen annulus and chamber surrounding screen 7. During this process to clean the support media, valve means 41 is normally closed to ensure no cross contamination of media and the filter would normally be off-line. A by-pass line can be included between inlet 36 to fluidising unit 37 and slurry outlet 38. The by-pass line can be provided with a control valve to control flow to adjust the concentration of support media removed.

A primary fluidising unit 12 is fed with raw or treated water under pressure, and flow is controlled via inlet 13 on vessel 1 such that it fluidises the filter media 9 and causes a discharge via outlet means 14 of the fluidising unit. The outlet means 14 passes through outlet means 15 of vessel 1, into media wash line 18. Valve means 16 which is also connected to the treated or raw water inlet, which feeds fluidising unit 12, is used to control the concentration of the discharged media slurry to the desired relative density best suited to the media cleaning stage. An instrument 17 for detecting the pressure drop between the raw water inlet 2 and the clean water outlet 8 for use in detecting the degree of contamination within the media bed 9 is used as a control function to initiate the washing of the filter bed.

In media slurry discharge line 18 an ultrasonic unit 19 may be used, if required, to impart to the slurry a cleaning action created by the use of high powered tubular ultrasonics devices. A heating means 20 such as a microwave generator or an induction coil, can be used to increase the temperature of the slurry passing through it to aid the cleaning process and where required adjust the viscosity of the liquid with a view to the combination or any part of 19 and 20 being used to regenerate, partially regenerate or surface scrub absorbent material, such as activated carbon. Chemical injection means 21 may be provided for the injection of a chemical such as a surfactant, detergent or enzyme, as may be required from time to time to assist in or accelerate media cleaning.

Media wash vessel 22, which has selective inlet means 23 or 24 controlled by valve means 25 or 26, delivers the media to be washed to a cyclonic cleaning means 27 which has an outlet for waste water 28 which is controlled by a flow control valve 29. A tertiary fluidising unit 30 of the type described above, is fed by water under pressure by valve means 32 and discharges cleaned media by discharge line 31 and valve means 33 to return it by line 34 back to a media return inlet 35 in vessel 1.

Alternatively, media to be cleaned can report to the top of media wash vessel 22 via inlet 24 which cleans the media by counter-current flow with valves 32 and 33 closed and valve 29 open. By either of these means the media 9 can be completely cleaned by removing and cleaning batch volumes of media until the media bed is turned over, either online whilst filtering, or offline as the case may be.

Figure 4:
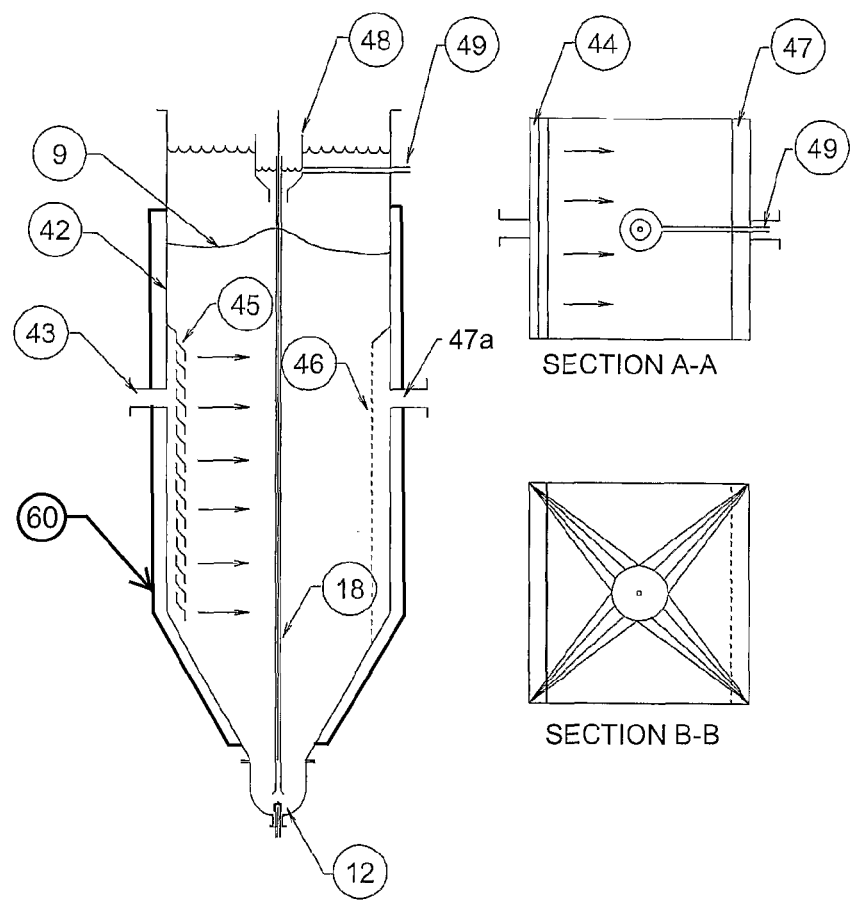
FIG. 4 is a sectional view of a cross flow media filter.

FIG. 4 shows another configuration of the filter which is made up of tank 42 which is generally of a circular or rectangular shape. A flow inlet 43 allows flow to fall into an inlet chamber 44 defined by screen 45 which distributes flow horizontally across a media filter bed 9 to be collected by a collection screen 46 which defines a chamber 47. The chamber 47 can contain media support material 11, and has a clean water outlet 47a. A fluidising unit 12, having a media slurry discharge line 18, discharges into a media wash pan 48 which allows media to fall by counter-current flow into the media bed 9, whilst contaminants from the media being washed discharges through line 49.

Figure 5:
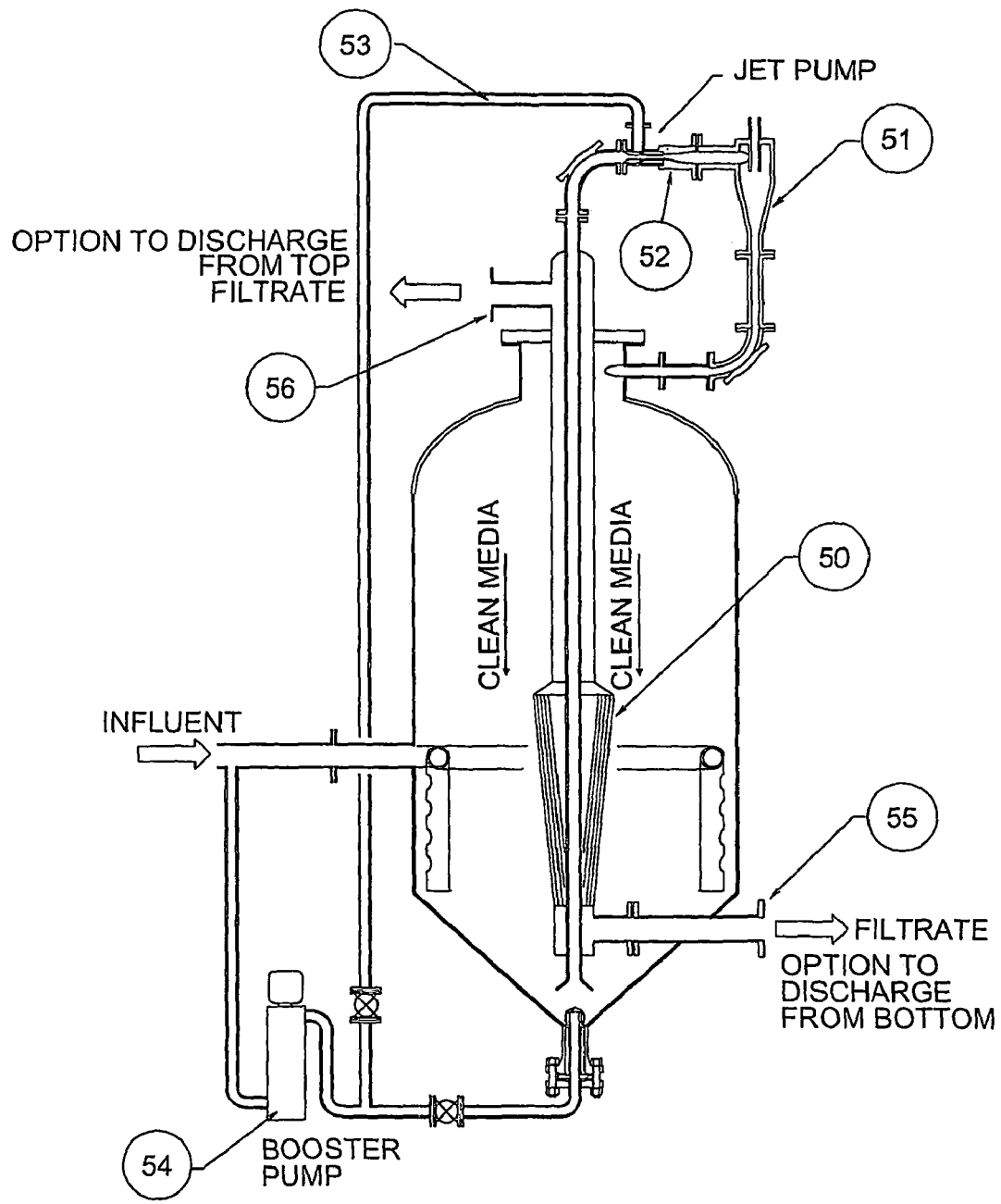
FIG. 5 is a sectional view of an alternative embodiment of radial filter.

FIG. 5 shows a radial filter similar to that shown in FIG. 2 with the following differences. The clean water collection screen 7, media support material 11 and media support screen 10 are configured as shown in assembly 50 of FIG. 5. All other features remain the same and the ability to clean the media support is retained, if required. The benefit of this conical clean water collection system is that, in the case of very fine media and high solids level in the raw water, this configuration will avoid media hang-ups, i.e. media not moving downwards, which will create a void at the base of the vessel, sometimes referred to as coning. Another feature of this radial filter is that a media wash cyclone 51 has its underflow coupled directly to return media to the top of the filter vessel 1 with its inlet from media close coupled to a jet pump 52 which is driven by raw water through line 53 and a booster pump 54. In the case of potable water the media washing stream would be potable water to avoid cross-contamination. The unit also has the ability to discharge filtrate from the base of the vessel through the discharge nozzle 55, or from the top of the vessel through the discharge nozzle 56.

Figure 6:
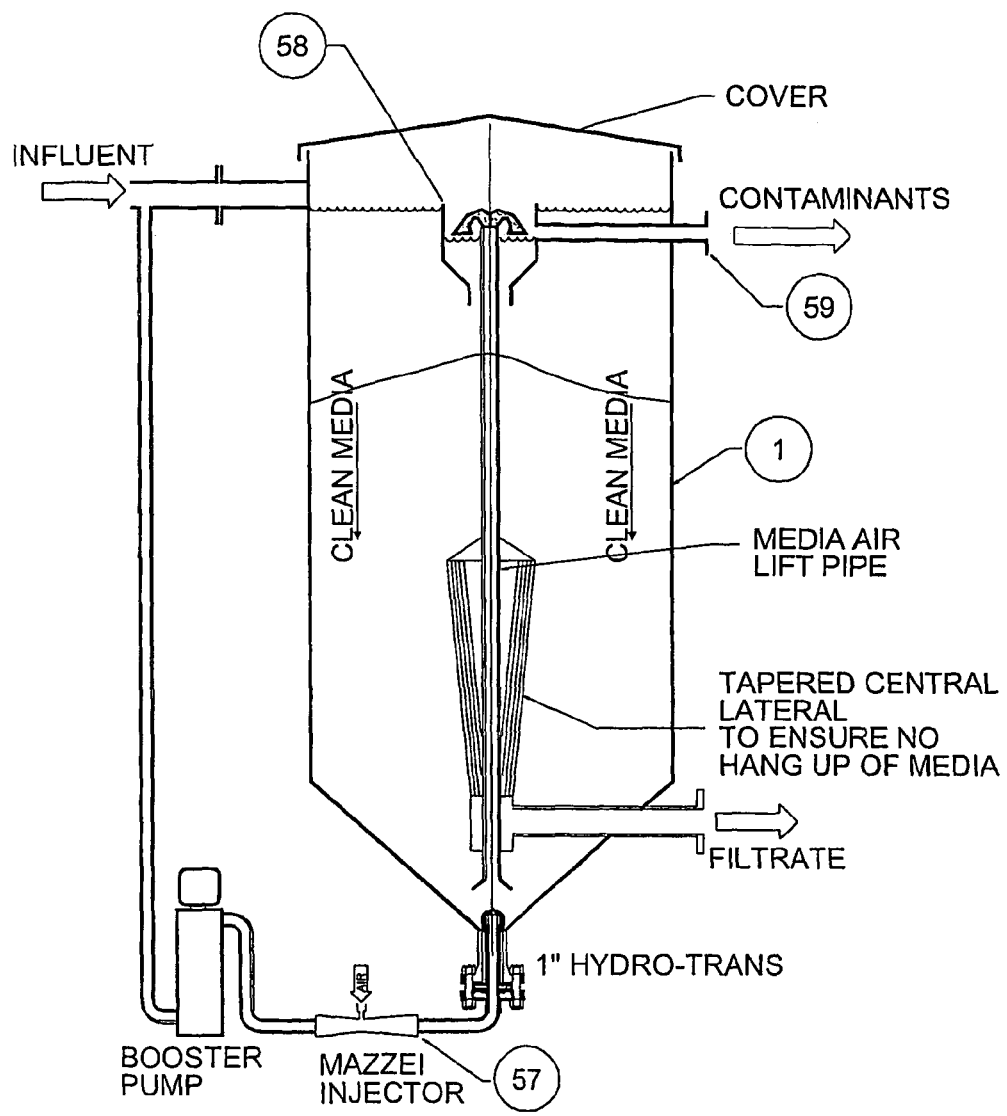
FIG. 6 is a sectional view of a downflow atmospheric media filter.

FIG. 6 is a downflow atmospheric media filter which has an air injector 57 upstream of the fluidising unit 12, in order to stabilise when required contaminated media which reports to a wash box 58 at the top of the filter vessel 1. The wash box 58 has a weir which is set below the normal water level which is constant in the upflow filter, which allows contaminants to float off into contaminant line 59.

Figure 7:
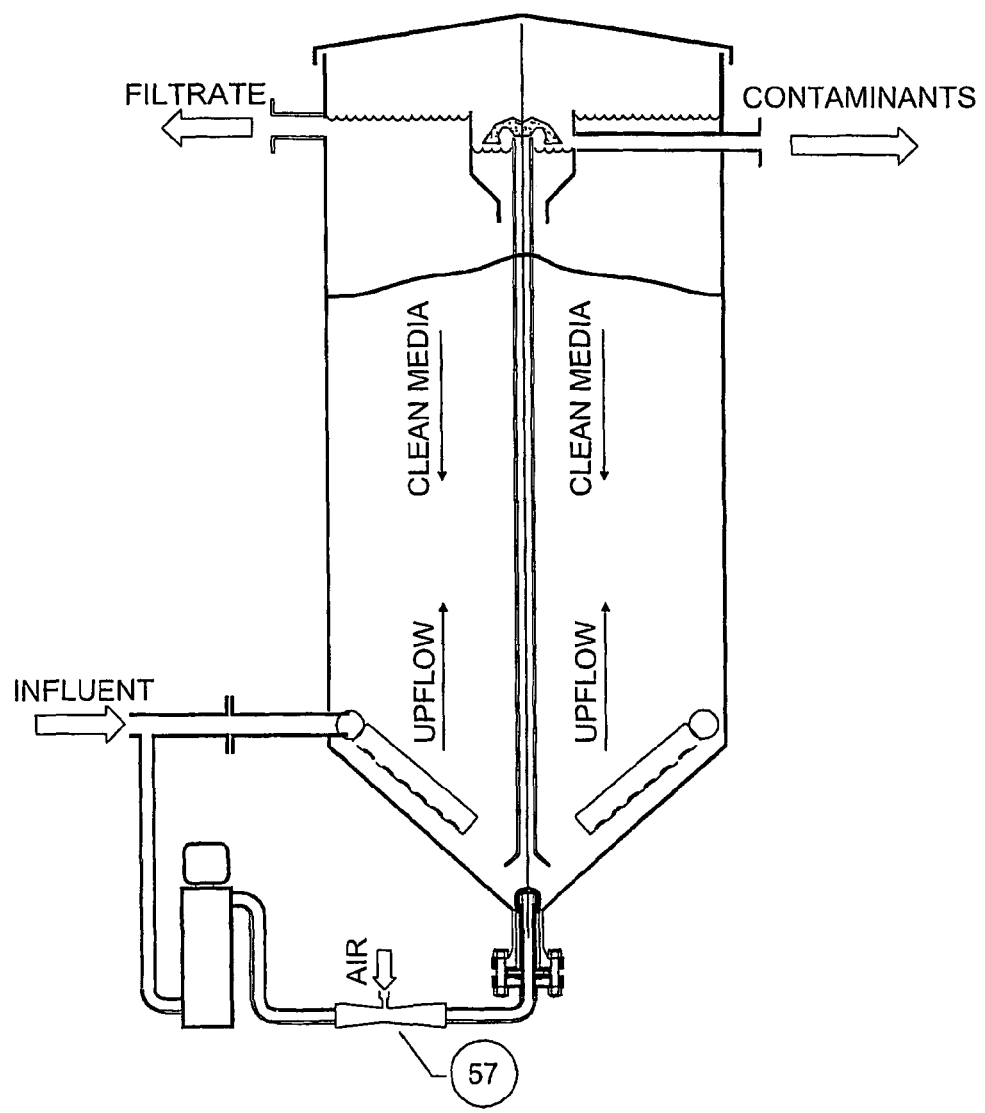
FIG. 7 is a sectional view of an upflow atmospheric media filter.

FIG. 7 is an upflow atmospheric media filter which may or may not utilise an air injector 57 on the upstream side of the fluidising unit 12 to wash the media in the same way as described in the downflow atmospheric filter of FIG. 6.

FIG. 8 is a detailed view of the circle in FIG. 3 of the sectional view of the pressurized radial media filter. Shown is second filter media 11 in secondary central screen 10, the second filter media 11 having a larger average size than filter media 9.

The invention claimed is:

1. A radial or crossflow media filter comprising a housing containing filter media, a contaminated flow inlet and a discharge outlet, the contaminated flow inlet comprising a manifold situated within the housing, the manifold having a flow outlet which directs flow laterally, away from the discharge outlet, and a discharge chamber situated within the housing upstream of the discharge outlet, the discharge chamber containing a second filter media which is of a larger average particle size than the rest of the filter media in the housing.

2. A filter as claimed in claim 1 in which the flow outlet is directed towards a sidewall of the housing.

3. A filter as claimed in claim 1 in which the manifold is provided with a plurality of flow outlets.

4. A filter as claimed in claim 1 in which the flow inlet comprises a substantially vertically aligned elongate manifold with a plurality of flow distribution outlets disposed along its length.

5. A filter as claimed in claim 1 in which the discharge chamber surrounds the discharge outlet.

6. A filter as claimed in claim 1 in which the discharge chamber is formed from a filter screen.

7. A filter as claimed in claim 6 in which the filter screen tapers inwardly towards the bottom of the housing.

8. A filter as claimed in claim 1 further comprising a fluidising unit in the base of the housing to fluidise the filter media and contaminants.

9. A filter as claimed in claim 1 further comprising a fluidising unit in the discharge chamber to fluidise the filter media and contaminants in the discharge chamber.

10. A filter as claimed claim 1 further comprising a tubular ultrasonic unit.

11. A filter as claimed claim 1 further comprising a heating unit.

12. A radial or crossflow media filter comprising a housing containing filter media, a contaminated flow inlet and a discharge outlet, the contaminated flow inlet comprising a manifold situated within the housing, the manifold having a flow outlet which directs flow laterally, away from the discharge outlet, and a discharge chamber situated within the housing upstream of the discharge outlet, the discharge chamber being formed from a filter screen and surrounding the discharge outlet, where the discharge chamber contains a second filter media which is of a larger average particle size than the rest of the filter media in the housing.

13. A filter as claimed in claim 12 in which the flow outlet is directed towards a sidewall of the housing.

14. A filter as claimed in claim 12 further comprising a fluidising unit in the base of the housing to fluidise the filter media and contaminants.

15. A filter as claimed in claim 12 further comprising a fluidising unit in the discharge chamber to fluidise the filter media and contaminants in the discharge chamber.

16. A method for treating contaminated flow comprising:
providing a radial or crossflow media filter comprising a housing containing filter media, a contaminated flow inlet and a discharge outlet, the contaminated flow inlet comprising a manifold situated within the housing, the manifold having a flow outlet which directs flow laterally, away from the discharge outlet, and a discharge chamber situated within the housing upstream of the discharge outlet, the discharge chamber containing a second filter media which is of a larger average particle size than the rest of the filter media in the housing;
introducing contaminated flow into the contaminated flow inlet;
contacting the flow with the filter media and the second filter media; and
discharging cleaner flow through the discharge outlet.

17. The method for treating contaminated flow of claim 16 further comprising fluidising the filter media and contaminants.

18. The method for treating contaminated flow of claim 16 further comprising fluidising the filter media and contaminants in the discharge chamber.

* * * * *